United States Patent Office 3,639,528
Patented Feb. 1, 1972

3,639,528
DYEABLE POLYOLEFINS CONTAINING ACID SALTS OF POLYVINYLPYRIDINES
Tad L. Patton, Baytown, Tex., and Raymond R. Haynes, Laurel, Md., assignors to Esso Research and Engineering Company
No Drawing. Filed July 5, 1968, Ser. No. 742,504
Int. Cl. C08f 33/08; D06p 3/00
U.S. Cl. 260—895          13 Claims

ABSTRACT OF THE DISCLOSURE

Uniform deep acid dyeing of shaped polyolefin articles, such as polypropylene fibers, is achieved by blending into the polyolefin, before shaping, vinyl pyridine polymers that have been reacted with either sulfuric acid, a sulfonic acid, a phosphoric acid, or certain derivatives thereof.

BACKGROUND OF THE INVENTION

Field of the invention

This invention relates to polyolefin compositions which may be formed into articles such as fibers and dyed with acid dyes. More particularly, it concerns polyolefin articles made acid dyeable by blending therein dye receptive polymers of vinyl pyridine bases that have been reacted with selected sulfur or phosphorous-containing acids.

Description of the prior art

Polyolefins have unique properties that make them a very attractive substance for fiber applications. They have no affinity for water, they dry extremely rapidly after immersion in water, and are highly resistant to the growth of mildew and other fungi. Because they are chemically inert to most foreign substances, they are highly resistant to soiling or staining and to attack from moths or other insects. Of the polyolefins, highly crystalline polypropylene makes a fiber that excels in physical properties, such as high strength, toughness, resilience, and abrasion resistance. In addition, by including selected oxidative and ultraviolet inhibitors, polypropylene fibers can be manufactured so as to be highly resistant to decomposition as the result of atmospheric exposure to prolonged or high levels of ultraviolet light. Thus, polypropylene provides an excellent fiber for many uses, and particularly for use in carpets.

The major problem retarding widespread use of polyolefins like polypropylene has been limited dyeability, a characteristic that stems from the inherent inertness of the polyolefin structure to chemical union with dye molecules. Polypropylene has been made dyeable with disperse dyes by blending dye receptor polymers of various vinyl pyridine bases into it to serve as dyesites. However, the fastness of dyed fibers of such blends to washing or dry cleaning is poor. Moreover, such fibers are not dyeable with acid dyes.

More recently it has been found that fibers formed from polypropylene having polyvinylpyridine dye-sites can be made receptive to acid dyes by pretreating the fibers with certain acids before dyeing. Acid treatment of the fiber, however, may result in a removal of oxidative and ultraviolet inhibitors from the fiber, causing the pretreated fibers to have unacceptable environmental stability. In addition, the nature of the acid treatment method introduces variables that make it difficult to obtain uniform dyeing from lot to lot, and level dyeing within one lot.

Specific prior art considered in connection with the present invention includes U.S. Pats. 3,315,014 and 3,361,843.

SUMMARY OF THE INVENTION

The foregoing problems of the prior art are overcome by the present invention, which involves an acid-dyeable composition comprised of a major amount of a polyolefin and a minor amount of a polymerized vinyl pyridine base that has been reacted with an acid selected from the group consisting of:
(1) Sulfuric acid
(2) A sulfonic acid of the formula

wherein:

R is a saturated alkyl radical containing from 1–18 carbon atoms or an organic radical chosen from those represented by the formulae:

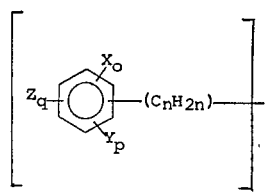

and

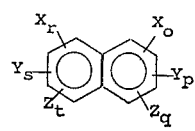

in which:

X is hydrogen or a saturated alkyl group of from 1–18 carbon atoms,
Y is hydrogen, chlorine or bromine,
Z is a nitro, amino, or hydroxyl group,
$m$ is a whole integer of from 1 to 3,
$n$ has a numerical value in whole numbers of from 0 to 18,
$o$ and $r$ have a numerical value of 0 to 3,
$p$ and $s$ are 1 to 4,
$q$ and $t$ are 0 to 1;

(3) Phosphoric acid; and
(4) A phosphoric acid ester having the formula:

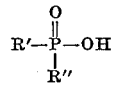

wherein:

R′ is an alkyl, aryl, alkoxy or aryloxy radical containing 1–18 carbon atoms, and
R″ is a hydroxy, alkyl, aryl alkoxy, or aryloxy radical containing 1–18 carbon atoms.

The composition may be fabricated into a shaped article, such as a polypropylene fiber, and uniformly and deeply dyed with an acid dye. No acid pretreatment of a formed article is necessary, and the oxidative and ultraviolet inhibitors which may be included in the blend are not thereby removed. Variations in acid dye uniformity are avoided since the amount of reacted polyvinylpyridine is well and consistently controlled from batch to batch. Level dyeing is facilitated because active dye receptors are evenly distributed throughout the fiber.

DESCRIPTION OF THE PREFERRED EMBODIMENT

A more complete understanding of the present invention and a fuller appreciation of its advantages may be gained from the following description of preferred modes, in which the following terms wherever used herein have the meanings now indicated.

The term "polyolefin" is used to mean a solid hydrocarbon polymer produced by the well-known high pressure, low pressure, or Ziegler-type polymerization processes from such alpha-olefins as ethylene, propylene, isobutene, 1-butene, 3-methyl-1-butene, 4-methyl-1-pentene, other high homologues of these alpha-olefins, diolefins such as 1,4-butadiene, etc.; and includes hydrocarbon polymers such as polystyrene, etc.; said polymer being a homopolymer, or a blend of homopolymers (e.g., polyethylene and polypropylene or polypropylene and polyisobutene), a copolymer of one such alpha-olefin with another such alpha-olefin or with a polymerizable olefinic monomer such as styrene, 1,4-butadiene or the like, whether random, block, or graft copolymer, such hydrocarbon polymers having molecular weights in the general range of 50,000 to 2,000,000.

The term "vinyl pyridine base" refers to vinyl substituted pyridine bases, both mono- and polycyclic, such as the vinyl pyridines and vinyl quinolines. Examples of such vinyl pyridine bases are 2-vinylpyridine, 3-vinylpyridine, 4 - vinylpyridine, 5 - ethyl-2-vinylpyridine, 2-methyl-5-vinylpyridine, 2 - methyl-6-vinylpyridine, 2,4-dimethyl-6-vinylpyridine, 5-propyl-2-vinylpyridine, 2-vinylquinoline, and 4-vinylquinoline. Polymers of vinyl pyridine bases, sometimes termed herein polyvinylpyridines, include homopolymers of one such base, copolymers of one such base with another such base, or with polymerizable monomers like styrene or butadiene, or graft copolymers of such bases onto solid hydrocarbon polymers like polyethylene, polypropylene, polybutadiene, or polystyrene.

The term "acid dye" is used as inclusive of acid-type dyes such as the simple acid dyes, mordant acid dyes, premetallized acid dyes, and direct dyes, all of which include in their chemical structure both a chromophoric group and a water solubilizing group. The term also includes dyes which perform as acid dyes but do not have a water solubilizing group, for example, neutral premetallized acid dyes.

The term "disperse dye" is used as inclusive of water-insoluble, colored, organic dyes which can be dispersed in water.

The term "fiber" shall mean a filament, drawn or undrawn, in the form of discrete mono- or multi-filaments, or yarn, or of woven, knitted or similar material, all of which may be textured or plain, staple or tow, or of preformed fabric such as films or sheets. The term "normal polyolefin fiber" means a fiber, as above defined, of a polyolefin, as above defined, containing no dye receptive additives.

The term "disperse dyeable fiber" means a fiber, as above defined, of whatever composition, natural or synthetic, which is dyeable with a disperse dye, as above defined. It particularly includes fiber comprised of blends of a polyolefin and a polymer of vinyl pyridine bases, as above defined, and, as used, excludes the acid dyeable fiber of this invention.

In accordance with the present invention there is provided an acid-dyeable composition, capable of being formed into fibers, comprised of a polyolefin matrix, preferably polypropylene, which contains a minor amount of a polymerized vinyl pyridine base that has been reacted with either sulfuric acid, phosphoric acid, alkyl or aryl partial esters of phosphoric acids, alkyl or aromatic mono- and polysulfonic acids, or derivatives or combinations thereof. The sulfonic acids which are reacted with polymers of vinyl pyridine bases in accordance with this invention are sulfonic acids of the formula $R(SO_3H)_m$, wherein R is a saturated alkyl radical containing from 1–18 carbon atoms or an organic radical chosen from those represented by the formulae:

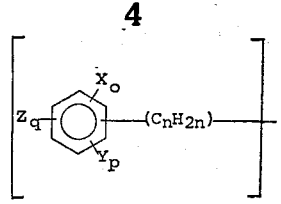

and

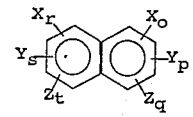

in which:

X is hydrogen or a saturated alkyl group of from 1–18 carbon atoms,
Y is hydrogen, chlorine or bromine,
Z is a nitro, amino, or hydroxyl group,
m is a whole integer of from 1 to 3,
n has a numerical value in whole numbers of from 0 to 18,
o and r have numerical value of 0 to 3,
p and s are 1 to 4, and
q and t are 0 or 1.

Sulfonic acids that may be employed are those, for example, which are set forth in the following representative, but by no means exhaustive, listing.

hexadecane sulfonic acid
dodecane sulfonic acid
ethane sulfonic acid
benzene sulfonic acid
benzyl sulfonic acid
2,3-xylene sulfonic acid
toluene sulfonic acid
m-benzene disulfonic acid
1,3,5-benzene trisulfonic acid
mesitylene sulfonic acid
dodecane benzene sulfonic acid
biphenyl-1-sulfonic acid
4-benzyl hexadecanyl sulfonic acid
1,1-diphenylethane α-sulfonic acid
2-chlorobenzene sulfonic acid
4-bromobenzene sulfonic acid
2,3-dichlorobenzene sulfonic acid
2-chlorotoluene-6-sulfonic acid
α-naphthalene sulfonic acid
β-naphthalene sulfonic acid
1,5-naphthalene disulfonic acid
8-nitro-1-naphthalene sulfonic acid
8-amino-1-naphthalene sulfonic acid
1-naphthylamine-4-sulfonic acid
2-naphthol-6,8-disulfonic acid
1-naphthylamine-3,6,8-trisulfonic acid Phosphoric acid and alkyl and aryl derivatives thereof, which may be reacted with polymers of vinyl pyridine bases in accordance with the present invention, are those acids represented by the formula:

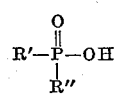

wherein R' is an alkyl, aryl, alkoxy or aryloxy radical containing 1–18 carbon atoms, and R" is a hydroxy, alkyl, aryl, alkoxy or aryloxy radical containing 1–18 carbon atoms.

Some of the phosphoric acids and derivatives of phosphoric acid which may be used are those set forth in the following exemplary listing.

primary or secondary propyl phosphoric acid
primary or secondary butyl phosphoric acid
diamyl phosphoric acid octa decyl phosphoric acid
di-2-ethyl hexyl phosphoric acid
dioctyl phosphoric acid
butyl, lauryl phosphoric acid
cyclohexyl phosphoric acid
phenyl phosphoric acid
methyl phenyl phosphoric acid
benzyl phosphoric acid
benzyl, phenyl phosphoric acid
naphthyl phosphoric acid
p-hexyl phenyl methyl phosphoric acid
2-phenylethyloctadecyl phosphoric acid
glycerol phosphoric acid The concentration of the present polyvinylpyridine reaction products that can be accommodated by the polyolefin matrix is limited by the end use to which the composition is to be put. Where it is to be spun into fiber, upper concentrations of about 10% by weight may be added without causing unacceptable breakdown of fiber during melt spinning. The ceiling concentration will vary, among other possible factors, with the degree of incompatibility of the polar or ionic polyvinylpyridine reaction product with the nonpolar polyolefin host, and with whether or not the reaction product is solid or liquid in the host polyolefin at melt spinning temperatures.

Adequate dyeing levels are provided at preferred polyvinylpyridine concentrations of about 2.0–3.0 weight percent, and most desirably, about 2.5–2.8 weight percent. Dye color levels are generally insufficient with polyvinylpyridine concentrations lower than about 2.0 weight percent, and significant color depth improvement relative to dye receptor cost is not obtained at polyvinylpyridine concentrations higher than 3.0 weight percent. Hence, a desirable range is from about 2.0 to about 10% by weight.

The amount of the particular reaction product of polyvinylpyridine which should be added to achieve a polyvinylpyridine concentration equivalent to about 2.0–3.0 percent is determined, at least in part, by the molecular weight of the anion of the reaction product and the mol multiple or mol fraction thereof in such reaction product. For example, in the case of poly(2-vinylpyridine):2/3 sulfate salts, the sulfate anion has a gram molecular weight of about 96 and the vinyl pyridine has a gram molecular weight of about 113, so about 64% of the molecular weight of the salt is contributed by vinyl pyridine base. Accordingly, a desired level of polyvinylpyridine is attained by adding about 1.6 more than that level of that salt to the blend; for the equivalent of 2.7 weight percent of polyvinylpyridine, about 4.3% by weight of that salt is added. In general, the greater the molecular weight and mol multiple or mol fraction of the anionic portion of the reaction product, the greater is the dilution of polyvinylpyridine in a gram molecular weight thereof, and the greater is the weight percent of reaction product which must be added, up to about 10% by weight of the blend, to provide a desired polyvinylpyridine concentration.

It is preferred, in the present invention, to react about 0.1 to about 2.0 mols of acid with one mol of a polymerized vinyl pyridine base. Several considerations determine the mol ratio to employ in a particular case. For example, the mol ratio of the anion of the sulfur-containing reaction products to that of the polyvinylpyridine thereof affects the melting point of the reaction product or acid salt, and thus the ease with which blends containing it may be melt spun into fibers. Whereas a ⅔ mol percent sulfate salt of a 40–60:60–40 copolymer of 2-methyl-5-vinylpyridine and 2-vinylpyridine is infusible at nominal spinning temperatures of 450–600° F., as is a 1:1 molar naphthalene disulfonate salt of such a copolymer, a ⅔ naphthalene disulfonate salt of that copolymer melts under such conditions. But naphthalene disulfonates are heavier anions, so more such salt must be added to provide adequate activated dyesite concentration.

The mol ratio of the anion of sulfur-containing reaction products to that of the polyvinylpyridine thereof also affects the water solubility of the reaction product, which may affect the ability of the reaction product to improve the dyeability of articles fabricated from the composition of this invention, as hereinafter explained. In this regard, there is some difference in water solubility between phosphate and sulfate salts of polyvinylpyridine. Most sulfate salts are hydroscopic, but some phosphate salts, such as mono-octyl phosphate salts, are not, and this will affect the dyeability performance of such salts. Thus, in general, the mol ratio of the anion of the particular sulfate, sulfonic, or phosphate salt is a balance between providing enough dyesites for satisfactory dyeing, yet not so much that the salt becomes water-insoluble in the fiber, and desirably, according to the character of the reaction product of acid and vinyl pyridine, not so much that the reaction product is infusible at extrusion and melt spinning temperatures.

Polyvinylpyridine acid salts of the present invention that are infusible at melt spinning and drawing temperatures can be melt spun and drawn, however, into good quality acid dyeable fibers. It has been found that by physically reducing the size of the polyvinylpyridine salt to a sufficiently fine state, and preferably by adding to the blend a water soluble lubricant such as polyethylene glycol, preferably of a molecular weight of about 200, a good quality dyeable fiber can be spun and drawn with conventional apparatus and under usual conditions. A comminuted size of from about 1–10 microns, but desirably 1–3 microns, has been found to provide a sufficiently fine state. Ball milling means were used to provide the comminution.

The polyethylene glycol preferably added to infusible salts blended into polyolefins like polypropylene appears to act as a partial solvent of said salts at the elevated extrusion and melt spinning temperatures, bringing such salts to an appreciable degree into a liquid state and effecting thereby a better dispersion of the salt in the polyolefin. It also apparently serves as an internal lubricant during the spinning step.

It will be understood that where acid salts of polyvinylpyridine graft copolymerized onto polyolefin backbones are produced, the melt blending step is omitted. The polyolefin graft copolymer salt is spun directly from the dried product.

Further details of the practice of the present invention are illustrated in the following examples in which all parts and percentages are by weight unless otherwise indicated.

EXAMPLE I

Preparation of salt 112 grams (one mole) of a 50:50 copolymer of 2-methyl-5-vinylpyridine and 2-vinylpyridine were stirred into 900 mls. of methanol until the copolymer was dissolved. Then a solution of 30 grams (0.31 mol) of sulfuric acid in 125 mls. of water was added with stirring, producing a heavy viscous liquid. This was then poured into 5 liters acetone to yield a thick, gummy precipitate. The mother liquor was decanted off, 5 liters of fresh acetone added to the precipitate, and the precipitate was kneaded under the acetone until broken into spheres of approximately 2 inches in diameter; the spheres were transferred to a round bottom flask and the residual acetone was removed under vacuum. The resulting salt was broken up with a spatula and ball-milled using a roller-type motor drive, constant speed ball mill, operated as described in "Fine Grinding of Coal," by R. J. Graves and R. A. Glenn, Bituminous Coal Research, Inc. booklet. Samples were ball-milled for 172 hours with sampling occurring every 24 hours to determine particle size. Nitrogen-blanketed, 24-hour samples were examined under an optical microscope employing 1000× magnification so that 1 mm. equaled 1 micron, as photographed. The particle size range, which was found over 172 hours of ball milling, is shown in Table 1. A yield of 93% was realized.

TABLE 1

Particle size distribution during ball milling

| Ball milled (hrs.): | Particle size distribution |
|---|---|
| 24 | 1–15 |
| 48 | 1–10 |
| 72 | 1–7 |
| 96 | 1–5 |
| 120 | 1–5 |
| 132 | 1–5 |
| 156 | 1–3 |
| 172 | 1–3 |

Analysis of the samples showed a nitrogen content of 9.3% (9.7% calculated) and a sulfur content of 6.5% (7.4% calculated).

Preparation of blend

A 3.8% blend of the ball-milled sulfate salt was then prepared in solid polypropylene. The same was extruded at 400° F. through a 325-mesh screen and pelletized. Two percent of a polyethylene glycol (200 MW) was added to the resulting pellets and the resulting blend extruded at 400° F.

Formation of fibers

The blend was melt spun at 470° F. to form fibers, which were then drawn at 4:1. The drawn fiber had the following physical properties:

Denier—197/34
Tenacity—3.89 gms./denier
Birefringence—$26.2 \times 10^{-3}$
Elongation—53%
Shrinkage at 290° F. in air—31.6
Cross-sectional—1.23 ratio, undrawn fiber Analysis of the fiber indicated a content of 0.30% nitrogen (0.37% calculated) and a content of 0.22% sulfur (0.27% calculated). Thus, little dyesite was lost in the spinning.

Dyeability

Knitted samples of the fiber were dyed at 208–210° F. in an agitated dyebath for one hour employing 1–2% O.W.F. (i.e., based on the weight of the fiber to be dyed) acid dye, 0.25% O.W.F. of Triton X–100 (an isooctyl-phenoxypolyethoxyethanol sold by Rohm & Haas Co.), 3.0% O.W.F. acetic acid, and a liquor ratio of 30:1 (i.e., 30 parts of liquor to 1 part of fiber). The acid dyes used and the K/S color values of the dyed fabrics are shown in Table 2. K/S is the ratio of the coefficient of absorption to the coefficient of scatter of the fabric and is equal to $$\frac{(1-r)^2}{2r}$$

where $r$ is reflectance obtained with a Color-Eye instrument manufactured by Instrument Development Laboratories of Attleboro, Massachusetts.

TABLE 2

| Percent | K/S 1 | K/S 2 |
|---|---|---|
| Erio Anthracene Brilliant Blue 2GC | 1.2 | 2.7 |
| Erio Anthracene Rubine 3GP | 3.1 | 6.7 |
| Vialon Fast Orange R | 2.3 | 3.1 |
| Vialon Fast Violet B | 2.0 | 2.9 |

Cross dyeings

Swatches made from fibers spun from a blend of 3% 40–60:60–40 copolymers of 2-vinyl pyridine and 2-methyl-5-vinylpyridine and 97% polypropylene were sewn to swatches made from fiber prepared as above described from sulfate salts of polyvinylpyridine. The swatches were cross dyed by both two-bath and single-bath techniques, using dyeing procedures described above.

For the two-bath technique, using an acid dye-bath first, the sewn materials were dyed with 2% Erio Anthracene Brilliant Blue 2GC. The swatch made of fiber containing the sulfate salt dyed to a deep blue, while the disperse swatch made of the polyvinylpyridine blend merely stained a light blue. Using a disperse dyebath first, the sewn materials were dyed with 1% Artisil Yellow G(DY–3). The material of fiber containing the sulfate salt dyed a pale yellow. The material made from fiber containing the polyvinylpyridine copolymer dyed to a deep yellow.

In the second bath, the sample previously dyed with only the acid dye was dyed with 1% Artisil Yellow G(DY–3). It gave a resultant cross dyed sample that was blue-green on the sulfate salt half and yellow-green on the polyvinylpyridine copolymer half. The sample previously dyed with only the disperse dye was dyed with 2% Erio Anthracene Brilliant Blue 2GC. The resulting cross dyed sample was blue-green on the sulfate salt half and yellow-green on the polyvinylpyridine copolymer half. In this case there was much more blue in the blue-green side and more blue on the yellow-green side than the samples dyed with the acid dye first.

For the one-bath technique, the sewn goods of the sulfate salt fiber and the polyvinylpyridine copolymer fiber were dyed in a bath containing both Erio Anthracene Brilliant Blue 2GC and Artisil Yellow G(DY–3). The resulting cross dyed sample showed a blue-green similar to that obtained when such a sample was first contacted with the acid dye, and a yellow-green similar to that obtained when such a sample was first contacted with the disperse dye.

EXAMPLE II

Preparation of salt 112 grams (one mol) of a 50:50 copolymer of 2-methyl-5-vinylpyridine and 2-vinylpyridine were dissolved in 5 liters of acetone, and 127 grams of toluene sulfonic acid monohydrate dissolved in 200 mls. of acetone were added thereto. A gummy precipitate resulted, which was reduced to a dry, swollen salt as described in Example I. After this, the sample was ball-milled for 24 hours to yield a fine white powder which, on analysis, was found to contain 6.20% nitrogen (6.17% calculated) and 9.25% sulfur (9.4% calculated).

Preparation of blend

A 6% blend of tosylate was prepared in polypropylene resin. The sample was extruded at 400° F. through a 325-mesh screen and pelletized. To the pellets was added 1.5% of a polyethylene glycol (MW 200), after which the sample was extruded again at 400° F.

Formation of fibers

Fibers of the tosylate salt sample were spun at 475° F. and drawn at 4:1. No problems were encountered. There was appreciable "smoking" at the die face during spinning, however. Extrusion and spinning of the sample was noted to be good. Analysis of the fibers showed a nitrogen content of 0.19% (0.37% calculated) and a sulfur content of 0.24% (0.56% calculated).

Dyeability

The knitted materials were then dyed according to the same procedure as detailed in Example I, with the dyes and resulting K/S values set forth in Table 3.

TABLE 3

| Percent | K/S 1 | K/S 2 |
|---|---|---|
| Erio Anthracene Brilliant Blue 2GC | 0.63 | 0.76 |
| Erio Anthracene Rubine 3GP | 1.8 | 2.7 |
| Vialon Fast Orange R | 0.60 | 0.97 |
| Vialon Fast Violet B | 0.48 | 0.94 |

EXAMPLE III

Preparation of salt

To 56 grams (0.5 mol) of a 40–60:40–60 copolymer of 2-vinylpyridine and 2-methyl-5-vinylpyridine dissolved in 180 mls. of methanol was added 54 grams (0.33 mol) of a phosphate ester having the average composition of

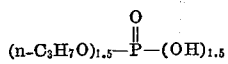

$$(n\text{-}C_3H_7O)_{1.5}\text{—}\overset{O}{\underset{\|}{P}}\text{—}(OH)_{1.5}$$

Preparation of blend

Resulting viscous material was blended into 530 grams of polypropylene powder to produce a masterbatch containing 17.2% dyesite. The masterbatch was let down to 4.0% dyesite with more polypropylene powder, proper inhibitors were added, and the blend was extruded at 400° F.

Formation of fibers

The pelletized blend was melt spun at 500° F. to form fibers which were then drawn at a ratio of 4.5:1.

Dyeabiliay

A swatch made from fibers spun from a polypropylene blend of 3% 40–60:60–40 copolymers of 2-vinylpyridine and 2-methyl-5-vinylpyridine was sewn to a swatch made from fiber prepared, as above described, from phosphate salts of polyvinylpyridine. The swatches were dyed in an acid dyebath, a disperse dyebath, and in a dyebath containing both disperse and acid dyes.

In the acid dyebath the sewn materials were dyed at 208–210° F. in an agitated dyebath for one hour employing 3% O.W.F. of Erio Anthracene Brilliant Blue 2GC, 3% O.W.F. formic acid, 0.25 gram per liter Orvus ES, and a 30:1 liquor ratio. After the sewn material had been after-scoured in an aqueous solution of surfactant and alkali, such as soda ash, at 120–160 F. to remove dye stain adhering to the surface, the swatch made of fiber containing the sulfate salt was found to have dyed to a deep blue, while the swatch made of the polyvinylpyridine blend only stained a light blue.

Using a disperse dyebath first, the sewn materials were dyed for one hour at boiling temperatures in an agitated dyebath containing 1.5% O.W.F. of Setacyl Yellow P–4RL, 0.25 gram per liter Orvus ES, and a 30:1 liquor ratio. The sewn material was after-scoured, as above described, and the swatch made of fiber spun from the copolymer blend was found to have dyed a deep yellow, while the swatch made from fiber containing the phosphate salt dyed a weaker yellow color.

For the one-bath technique, the sewn goods of the phosphate salt propylene fiber and the polyvinyl-pyridine copolymer propylene fiber were dyed for one hour at boiling temperatures in an agitated dyebath containing 3.0% O.W.F. Erio Anthracene Brilliant Blue 2GC and 1.5% O.W.F. Setacyl Yellow P–4RL, 3.0% O.W.F. formic acid, 0.25 gram/liter Orvus ES, and a liquor ratio of 30:1. The swatch containing fiber made from the phosphate salt of polyvivnylpyridine was dyed a heavier green shade (Cable No. 700036, Standard Color Card of America), while the swatch made from fiber prepared from the polyvinylpyridine copolymer blend was an olive shade (Cable No. 70156, Standard Color Card of America), after both had been after-scoured.

It is therefore seen that fabrics can be knitted and woven from acid dyeable fiber of the present invention in combination with a nondyeable fiber, such as normal polyolefin fiber, or a disperse dyeable fiber, or both, and according to the dye makeup of the dyebath or several dyebaths serially used, that is, the kind and concentration of disperse or acid dye, or both, one may obtain a spectrum of multicolor effects, including white-and-color, for piece dyed goods.

As heretofore stated, in addition to avoiding sacrifice of ultraviolet and oxidative stability of the host fiber by removal by acid pretreatment prior to dyeing of inhibitor packages which maye be added to the blend from which the fiber is formed, a prime advantage of this invention is its provision of a precise way to repeatably control the color uniformity of acid dyeable polyolefins, particularly polypropylene. By blending predetermined amounts of stoichiometrically reacted polyvinylpyridine into the polyolefin, one obtains a repeatably matchable quantity of dyesites "activated" to combine with acid dye molecules. This provides level dyeing in a single dyed lot and constancy of color quality from lot to lot.

Moreover, blending the reacted polyvinylpyridine into polyolefins before the polyolefin is formed into an article such as a fiber appears to increase dyeing efficiencies by assuring "activation" of even deep-seated dyesites, thereby providing deeper dyeing to an individual fiber. Although it is to be understood that the present invention is not to be considered confined to any particular theory of operation with regard to the deeper dyeing, it appears possible that, in the acid dye bath, the salts of the vinyl pyridine polymers, some more effectively than others, are partially dissolved from the fiber into the dyebath, leaving infinitesimal channels in the polypropylene matrix which allow dye molecules to gain access to subsurface dye receptor sites. Because the polyvinylpyridine salts of the present invention are part of the composition from which the fiber is made and are not simply formed in situ on the surface of a fiber containing polyvinylpyridine dye receptors, access channels to deep-seated dyesites are obtained and dyeing is made deeper as well as more uniform.

While the present invention is applicable to all shaped articles of polyolefins such as fibers, foils, films, rods, strands, and the like, for simplicity of description it has been described as it is applicable to fibers, it being understood that this is merely intended in an illustrative sense and that the invention should not be limited thereby.

Having fully described the best modes and embodiments of the present invention, it is to be understood that the present invention is not limited to the specific details set forth, but is of the full scope of the appended claims.

What is claimed is:

1. An unshaped dyeable composition capable of being formed into fibers which comprises:
   (a) a major amount of a polyolefin, and
   (b) a minor amount, effective for uniform deep dyeing, of the reaction product of polymerized vinyl pyridine base with an acid selected from the group consisting of:
      (1) sulfuric acid,
      (2) alkyl, aryl, alkaryl, halo, nitro, and amino substituted sulfonic acids,
      (3) phosphoric acid, and
      (4) alkyl, aryl, alkoxy, aryloxy, and hydroxyl substituted phosphoric acid esters.

2. A composition in accordance with claim 1 in which the effective amount of the reaction product is within the range from about 2% to about 10% by weight of the composition.

3. An unshaped dyeable composition capable of being formed into fibers which comprises:
   (a) a major amount of a polyolefin, and
   (b) a minor amount, effective for uniform deep dyeing, of the reaction product of a polymerized vinyl pyridine base with an acid selected from the group consisting of:
      (1) sulfuric acid;
      (2) a sulfonic acid of the formula

$$R(SO_3H)_m$$

wherein
R is a saturated alkyl radical containing from 1–18 carbon atoms or an organic radical chosen from those represented by the formulae:

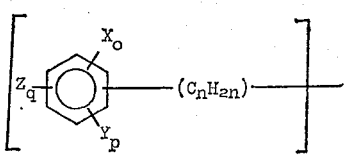

and

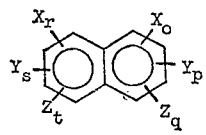

in which
 x is hydrogen or a saturated alkyl group of from 1–18 carbon atoms,
 Y is hydrogen, chlorine or bromine,
 Z is a nitro, amino, or hydroxyl group,
 m is a whole integer of from 1 to 3,
 n has a numerical value in whole numbers of from 0 to 18,
 o and r have a numerical value of 0 to 3,
 p and s are 1 to 4, and
 q and t are 0 or 1;
(3) phosphoric acid; and
(4) a phosphoric acid ester having the formula:

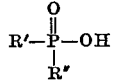

wherein
 R' is an alkyl, aryl, alkoxy or aryloxy radical containing 1–18 carbon atoms, and
 R" is a hydroxy, alkyl, aryl, alkoxy, or aryloxy radical containing 1–18 carbon atoms.

4. The dyeable composition of claim 3 containing about 90–98% by weight of polyolefin and about 2–10% by weight of the reaction product of one mol of a polymerized vinyl pyridine base reacted with about 0.1 to 2 mols of said acid.

5. The composition of claim 3 in which said polyolefin is polypropylene.

6. The composition of claim 3 in which said reaction product is infusible at temperatures ranging from 450–600° C. and is present in the composition in particle sizes no larger than 10 microns in diameter.

7. The composition of claim 3 further comprised of 0 to 3% by weight of polyethylene glycols of a molecular weight on the order of about 200.

8. A method of making an article uniformly and deeply dyeable with acid dyes which comprises shaping the composition defined in claim 3 into an article.

9. The method of claim 8 in which said article is a fiber.

10. A shaped article comprised of the composition of claim 3.

11. A fiber comprised of the composition of claim 3.

12. An unshaped dyeable composition capable of being formed into fibers which comprises:
 (a) a major amount of a hydrocarbon polymer selected from polymers of α-olefins, diolefins, and styrene having molecular weights in the range from about 50,000 to about 2,000,000, and
 (b) a minor amount, effective for uniform deep dyeing, of the reaction product of polymerized vinyl pyridine base with an acid selected from the group consisting of:
  (1) sulfuric acid,
  (2) alkyl, aryl, alkaryl, halo, nitro, and amino substituted sulfonic acids,
  (3) phosphoric acid, and
  (4) alkyl, aryl, alkoxy, aryloxy, and hydroxyl substituted phosphoric acid esters.

13. An unshaped dyeable composition capable of being formed into fibers which comprises:
 (a) a major amount of a hydrocarbon polymer selected from polymers of α-olefins, diolefins, and styrene having molecular weights in the range of from about 50,000 to about 2,000,000, and
 (b) a minor amount, effective for uniform deep dyeing, of the reaction product of a polymerized vinyl pyridine base with an acid selected from the group consisting of:
  (1) sulfuric acid;
  (2) a sulfonic acid of the formula

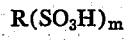

wherein
  R is a saturated alkyl radical containing from 1–18 carbon atoms or an organic radical chosen from those represented by the formulae:

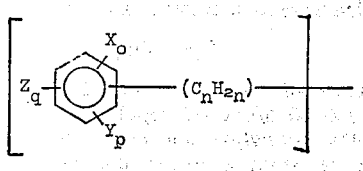

and

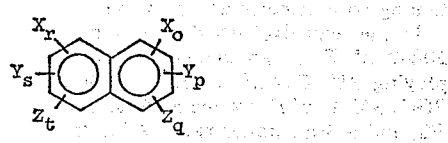

in which
 X is hydrogen or a saturated alkyl group of from 1–18 carbon atoms,
 Y is hydrogen, chlorine or bromine,
 Z is a nitro, amino, or hydroxyl group,
 m is a whole integer of from 1 to 3,
 n has a numerical value in whole numbers of from 0 to 18,
 o and r have a numerical value of 0 to 3,
 p and s are 1 to 4, and
 q and t are 0 or 1;
(3) phoshoric acid; and
(4) a phosphoric acid ester having the formula:

wherein
 R' is an alkyl, aryl, alkoxy or aryloxy radical containing 1–18 carbon atoms, and
 R" is a hydroxy, alkyl, aryl, alkoxy, or aryloxy radical containing 1–18 carbon atoms.

References Cited

UNITED STATES PATENTS 3,361,843  1/1968  Miller et al. _____ 260—857
3,366,710  1/1968  Press _____ 260—896

MURRAY TILLMAN, Primary Examiner
J. SEIBERT, Assistant Examiner

U.S. Cl. X.R.

8—180; 260—41 C, 41.5 R, 887; 264—78